Aug. 1, 1961　　　　H. GLEITSMAN ET AL　　　　2,994,364
ADJUSTABLE OTTOMAN
Original Filed Jan. 28, 1957　　　　　　　　　2 Sheets-Sheet 1
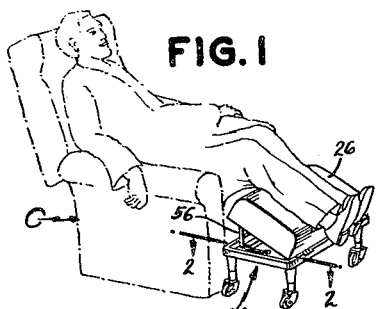
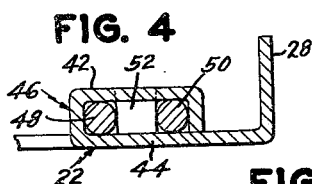
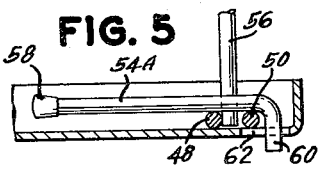
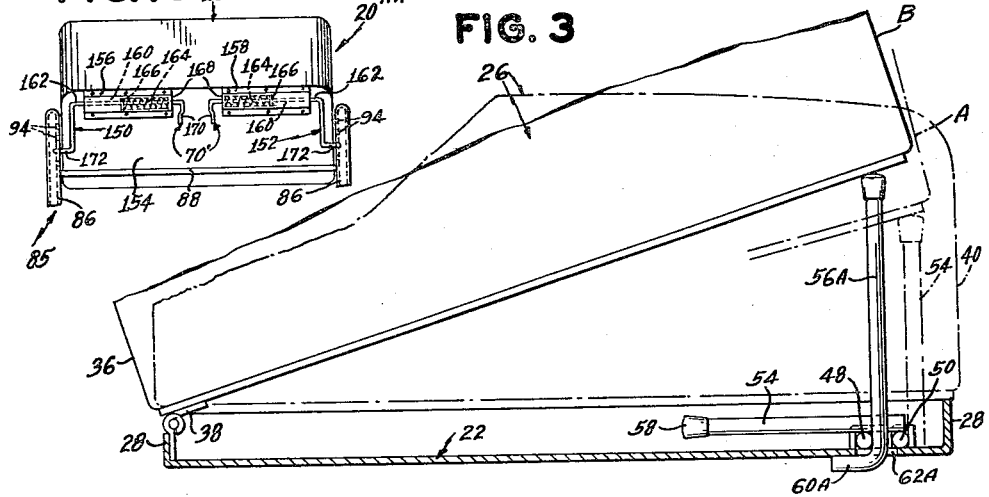
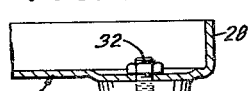
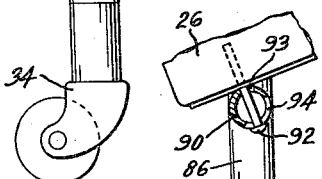
INVENTORS
Harold Gleitsman
Carl Fuerst
BY Edwin Linsak
Harry Cole
ATTORNEYS

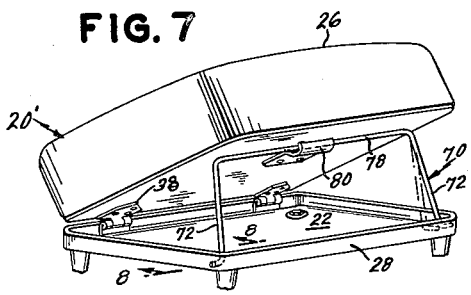
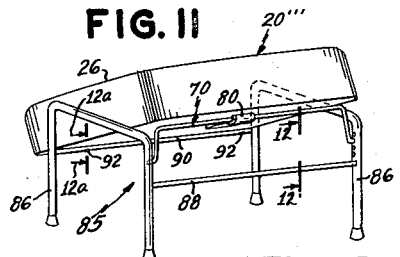
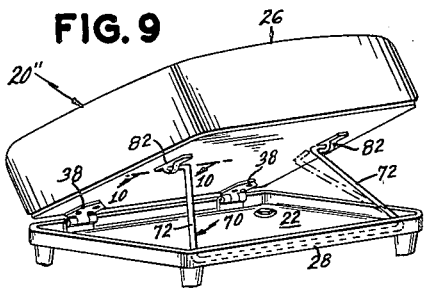
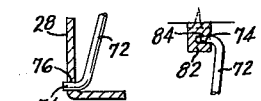
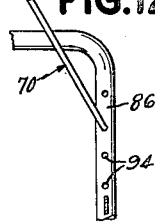
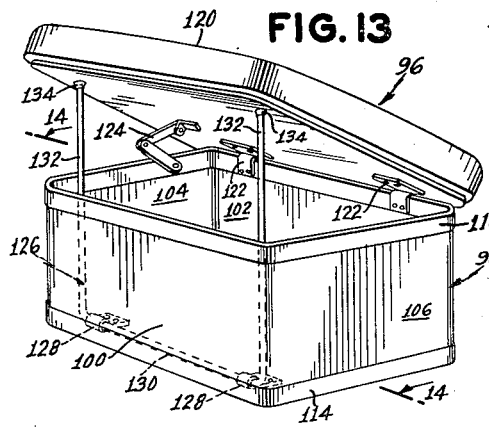
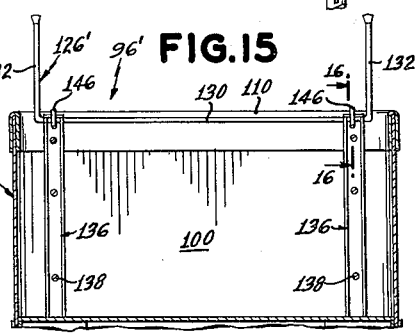
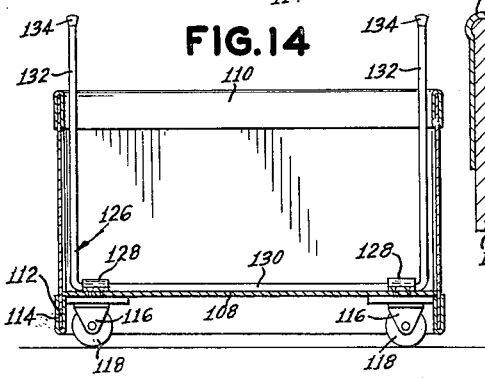
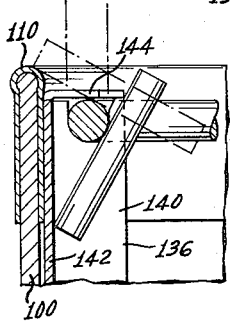
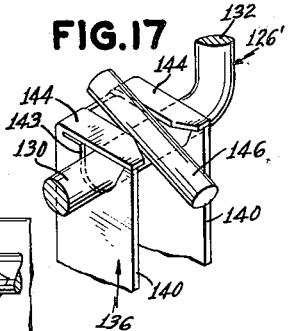

United States Patent Office 2,994,364
Patented Aug. 1, 1961

2,994,364
ADJUSTABLE OTTOMAN
Harold Gleitsman, New Rochelle, and Carl Fuerst, Bronx, N.Y., assignors to Gleitsman's, Inc., Long Island City, N.Y., a corporation of New York
Original application Jan. 28, 1957, Ser. No. 636,646. Divided and this application Mar. 19, 1959, Ser. No. 811,244
4 Claims. (Cl. 297—439)

The present application is a division of Serial No. 636,646, of Harold Gleitsman and Carl Fuerst, filed January 28, 1957 for Adjustable Ottoman.

The present invention relates to ottomans.

So-called "posture chairs," now in wide spread use, are recommended as a health attribute due to the complete relaxation that they provide. However, said "posture chairs" are relatively expensive, cumbersome, and do not lend themselves readily to the decorative schemes of living rooms or the like. Highly novel types of ottomans, which obviate the foregoing disadvantages of the "posture chairs," are disclosed in the copending application of Harold Gleitsman and Carl Fuerst, Serial Number 591,228 filed June 13, 1956, now Patent No. 2,838,097, issued June 10, 1958. The present invention relates to improvements in the ottomans disclosed in said copending application.

An object of the present invention is the provision of a relatively inexpensive and simple device which will convert any conventional chair or seat into a "posture chair" and which will not interfere with the decor or decorative scheme of furniture used in the particular room in which said device may be used.

Another object is the provision of an ottoman or the like, which when associated with a conventional chair or seat, will convert said chair or seat into a "posture chair."

Another object is the provision of a backless seat of the bench type which can function either as an ottoman or for converting a conventional chair into a "posture chair."

A further object is the provision of a combined storage hassock, seat and ottoman, which, when associated with a conventional chair or seat, will provide a "posture chair."

The above and other objects, features and advantages of the present invention will be more fully understood from the following description considered in connection with the accompanying illustrative drawings.

In the drawings which illustrate the best modes presently contemplated of carrying out the invention:

FIG. 1 is a perspective view of a "posture chair" or seat formed by the ottoman of the present invention in association with a conventional chair;

FIG. 2 is a sectional view, on an enlarged scale, taken on the line 2—2 of FIG. 1;

FIG. 3 is a sectional view, on an enlarged scale, taken on the line 3—3 of FIG. 2;

FIG. 4 is a fragmentary sectional view, on an enlarged scale, taken on the line 4—4 of FIG. 2;

FIG. 5 is a fragmentary sectional view, on an enlarged scale, taken on the line 5—5 of FIG. 2;

FIG. 6 is a fragmentary sectional view, on an enlarged scale, taken on the line 6—6 of FIG. 2;

FIG. 7 is a perspective view and illustrates a modification of the invention;

FIG. 8 is a fragmentary sectional view, on an enlarged scale, taken on the line 8—8 of FIG. 7;

FIG. 9 is a view similar to FIG. 7 and illustrates an additional modification;

FIG. 10 is a sectional view, on an enlarged scale, taken on the line 10—10 of FIG. 9;

FIG. 11 illustrates a further modification;

FIG. 12 is a sectional view, on an enlarged scale, taken on the line 12—12 of FIG. 11;

FIG. 12A is a fragmentary sectional view, on an enlarged scale, taken on the line 12A—12A of FIG. 11;

FIG. 13 is a perspective view which illustrates another embodiment of the invention;

FIG. 14 is a sectional view, taken on the line 14—14 of FIG. 13;

FIG. 15 is a view similar to FIG. 14 and illustrates a modification;

FIG. 16 is a fragmentary sectional view, on an enlarged scale, taken on the line 16—16 of FIG. 15;

FIG. 17 is a fragmentary perspective view of a mechanism utilized in the embodiment of FIGS. 15 and 16 with said mechanism being reversed by substantially 180 degrees from the disposition illustrated in FIG. 16; and FIG. 18 is a fragmentary elevational view illustrating a modification in the device of FIG. 11.

Referring now to FIGS. 1 through 6 of the drawings in detail, there is shown an ottoman or bench 20 pursuant to the present invention. The ottoman 20 is in the form of a bench or backless seat. More specifically, the seat 20 comprises a base member 22 provided with the legs 24, and which pivotally mounts a bench top or seat 26.

More specifically, and as best illustrated in FIGS. 2, 3 and 6, the base member 22 is a rigid member provided with a peripheral upwardly directed flange 28 and having cut outs 30 to reduce the weight thereof. At each corner thereof, the base 22 is provided with a leg 24 which is suitably secured thereto, as by the securing means 32. Each leg 24 mounts a freely rotatable caster 34. The seat or bench top 26, which may be formed of any suitable material and which is preferably padded and upholstered, is hinged at the bottom thereof and adjacent the rear end 36 thereof, as by the hinges 38—38 to the upper surface of the base member 22.

When the ottoman 20 is used as a backless seat or bench, the seat 26 is in the normal or broken line position thereof illustrated in FIG. 3 with the forward or free end 40 of the seat supported on the flange or skirt 28, as illustrated in FIG. 3, and with the opposite or hinged end 36 thereof secured by means of the hinge to the base member 22. Pursuant to an important aspect of the present invention, provision is made for relatively simple mechanism to retain the seat 26 in different tilted or adjusted dispositions thereof for utilization as an adjustable ottoman or foot rest in connection with a conventional chair to convert the latter into a "posture chair."

More specifically, a portion 42 of the material of the base 22 is punched or struck out of the base and is bent over the underlying portion 44 of the base 22 to define a housing 46, as best illustrated in FIG. 4. A pair of rods 48 and 50 are mounted in the housing, extending longitudinally thereof with the opposite ends of each rod extending outwardly from the housing, as best illustrated in FIG. 2. It will be noted that the rod 48 is longer than the rod 50. Said rods are free to rotate within the housing 46, the rods being retained in spaced relation relative to each other by the integral tabs or spacers 52—52 provided on the housing 46. Adjacent the opposite ends thereof, the shorter rod 50 is provided with the rod like legs 54—54A which are suitably secured, as by welding or soldering, thereto and each of which is provided at its end remote from the rod 50 with a cap 58 formed of rubber or other resilient material. The leg or stop 54 differs from the leg or stop 54A in that the leg 54 terminates substantially at the portion thereof which is secured to the rod 50 and the leg 54A extends beyond its securement to the rod 50, being provided with the bent or angularly directed end 60 which extends into an associated slot 62 provided in the base member 22, the function of which is hereinafter described in detail. The longer rod 48 is also provided with a pair of rod like legs or stops 56 and 56A which are similar to the previously described legs or stops 54 and 54A but which are longer than the latter. It will be noted from FIG. 2 that the leg 56 of the rod 48 is outwardly of the leg 54A of rod 50 and the leg 56A is outwardly of the leg 54. It will also be noted that a slot 62A is provided in the base member 22 to accommodate the curled end of the stop or leg 56A.

Due to the previously described rotary movement of each of the rods 48 and 50 within the housing 46, it will be apparent that each set of the associated detents 54—54A and 56—56A, can be pivoted to and from the inoperative disposition thereof, wherein they overlie the base member 22 as indicated in the case of the rods or detents 54 and 54A in FIGS. 2 and 5, and as shown in full line for the rod 54 in FIG. 3, to the upright operative position thereof, substantially at right angles to the base member 22, as shown in full line in the case of the detents 56A and 56 in FIGS. 3 and 5, wherein each rod and its associated legs constitutes a brace or support for the tilted seat.

In using the ottoman 20 as a backless seat or bench, the top 26 is in the closed or lowered position thereof as indicated in the broken line position thereof shown in FIG. 3, it being understood that in said position the shorter legs 54 and 54A as well as the longer legs 56 and 56A are each folded over into substantially parallel positions relative to the base member 22, as indicated in full line for the short legs 54 and 54A in FIG. 2 and in broken line for the longer legs 56 and 56A in said figure. It will be readily apparent that in said position of the seat or top 26, the latter overlies and completely conceals said legs from view so that the article 20 appears to be a conventional backless seat or bench.

When it is desired to utilize the hassock 20 as an adjustable foot rest, the seat 26 may be adjusted to one of two elevated positions, pursuant to the present embodiment of the invention. In this connection, it will be understood that the short legs 54 and 54A may be raised to the broken line position thereof illustrated in FIG. 3 to serve as props or supports for the seat 26 adjacent the free side or end 40 thereof, as illustrated in the raised position of the seat 26 indicated at A in FIG. 3. If it should be desired to increase the amount by which the seat is raised or tilted from the base 22, as indicated by the position B thereof in FIG. 3, the longer legs 56 and 56A are utilized in place of the shorter legs 54 and 54A, as will be readily apparent. It will be noted that provision is made to limit the movement of each pair of associated legs to the raised position thereof so that each set of raised legs will be substantially perpendicular to the base 22, to prevent the inadvertent disengagement thereof from the seat 26 by a movement thereof outwardly of the base 22. In this connection, it will be noted that during the movement of the associated legs to the raised position thereof, the previously described bent end or tail 60A on longer leg 56A, and the similar tail 60 on the shorter leg 54A, each moves through the associated base slot from the position thereof illustrated in FIG. 5 to the position thereof illustrated in FIG. 3, so as to engage the undersurface of the base 22. It will be understood that this action is the same for each of the legs 54A and 56A, FIG. 5 illustrating the inoperative position of the tail 60 on the short leg 54A and FIG. 3 illustrating the position of the corresponding tail 60A on the long leg 56A in the operative position of the latter.

With the seat 26 raised to either of its positions A or B, it may be associated with a conventional chair C, as shown in FIG. 1, to constitute a posture or health chair. The tail 60 serves as a detent for its associated legs in position A and the tail 60A serves as a detent for its associated legs in position B.

Referring now to FIGS. 7 and 8 in detail, there is illustrated a modification of the ottoman bench 20. As here shown, provision is made for an ottoman 20' which is essentially the same as the previously described ottoman 20 except that in lieu of the two sets of legs 54—54A and 56—56A to retain the seat 26 in either of two raised, adjusted or tilted positions thereof, provision is made for raising the seat 26 to only one position thereof. More specifically, pursuant to the present modification, the base 22 is provided with a U-shaped support or brace 70 which is pivotally mounted thereon. Said brace 70 is provided with the opposing sides or arms 72—72 which terminate in laterally extending free ends 74 which are pivotally mounted in opposing apertures 76 provided in the base flange 28, as best shown in FIG. 8. In this connection, it will be understood that the material of which the support 70 is formed has sufficient inherent resiliency whereby the opposing arms may be moved together, as shown in broken line, to facilitate the insertion into or the removal from the companion apertures 76 of the associated opposing ends 74, as will be readily understood.

The U-shaped brace 70 is also provided with a bight portion 78 extending between the opposing arms 72 and the seat 26 is provided on its undersurface with a spring clip or catch 80 in which the bight 78 is removably received for pivotal movement thereof.

It will be understood that in the closed position of the seat 26, the brace 70 is removed from the clip 80. When it is desired to retain the seat 26 in the tilted position thereof shown in FIG. 7, the brace 70 is mounted in the clip and the free ends 74—74 thereof are biased into engagement in the pivot apertures 76—76 in the base flange 28, to releasably retain the seat in its elevated condition for utilization with a chair C to form a contour or posture seat, as previously described.

Referring now to FIGS. 9 and 10, there is illustrated an additional modification in the ottoman bench 20. As here shown, provision is made for an ottoman or hassock 20'' which is similar in all respects to the previously described hassock 20' of FIG. 7 with the sole exception that provision is made for a U-shaped member or brace 70 which is pivotally mounted on the undersurface of seat 26 and not on the flange 28 of the base. Pursuant to the present embodiment, a pair of spaced brackets 82—82 are secured to the undersurface of the seat 26 and said brackets constitute bearings in which the inherently resilient U-shaped member 70 is removably mounted for pivotal movement. More specifically, the free ends 74 of the opposing arms 72 are biased into recesses 84 provided in the brackets 82, whereby to mount the member 70 for pivotal movement. The member 70 may be readily mounted in the brackets 82 by first compressing the arms 72 towards each other as indicated in broken line in FIG. 9 and then permitting the arms to return to the relaxed position thereof after each end 74 thereof is aligned with an associated aperture 84. As in the hassock 20, in the normal closed position of the seat 26, the member 70 is removed from the hassock 20''. In order to releasably retain the seat in the raised position thereof, the member 70 is inserted into the pivot bearings 82 and pivoted to the position thereof illustrated in FIG. 9, after the seat is raised, so that the member 70 engages in a corner formed by the base 22 and the flange 28 opposite the hinges 38, as will be readily apparent.

Referring now to FIGS. 11, 12 and 12A in detail, there is illustrated another modification of the hassock. Pursuant to the present modification, provision is made for a hassock 20''' which, in lieu of the legged base of the hassocks 20, 20' and 20'', utilizes an open-work frame, generally indicated by the reference numeral 84. As here shown, the frame 85 is constituted by a pair of opposing inverted U-shaped frame members 86—86 interconnected by a pair of tubes 88 and 90, the opposite ends of each tube being suitably secured between associated portions of the opposing frame members 86 to provide the four sided frame 85, as illustrated in FIG. 11. The seat 26 extends between the opposing frame members 86 and is pivotally secured in any suitable fashion to the rear rod 90. For example, and not by way of limitation, as shown in FIG. 12A, the seat is secured for pivotal movement to the tube 90 by a pair of bolts 92 which extends through arcuate slots 93—94 provided in the tube 90 to permit the pivotal movement of the seat 26 on the tube. In order to mount or secure the seat 26 in different tilted or elevated positions thereof, provision is made for a U-shaped brace which is pivotally mounted in a spring clip or bracket 80 provided on the underside of the seat 26, in the same manner as previously described in connection with the brace 70 and clip 80 of FIG. 7. In the portions thereof interconnected by the front tube 88, the frame members 86 are provided with a plurality of vertically spaced apertures 94, the apertures being in opposing portions of the frame members 86 so that they are provided on the inner surfaces or opposing surfaces of said frame members. As previously indicated, the opposite ends of the brace 70 are spring biased into the openings provided in the frame members 86, as indicated in FIGS. 11 and 12, the brace 70 being readily removable from said openings by merely pressing the opposing ends thereof toward each other, the brace being also readily removable from the spring clip 80. It will be apparent that due to the provision of a plurality of vertically spaced openings in each member 86, the seat 26 may be adjusted in any one of a plurality of tilted positions. In its use as a bench, the free side of the seat rests on the tube 88, as will be readily apparent. It will be understood that each of the ottomans or benches 20', 20" and 20''' can be used in connection with a conventional chair to provide a posture chair, as previously described.

Referring now to FIGS. 13 and 14 in detail, there is illustrated another embodiment of the present invention. In the present embodiment, provision is made for an ottoman 96 which also functions both as a storage box and as a seat. The ottoman 96 is constituted by a box like base 98 having the opposing front and rear walls 100 and 102, and the opposing side walls 104 and 106, and provided with a bottom wall 108. The box may be formed of any suitable material and provided, if desired, with a decorative finish or covering. A protective strip 110 is bent over the top peripheral edge of the box 98 and is secured thereto in any suitable fashion. It will be noted that the front, rear and side walls of the box extend below the base wall 108 to form the peripheral skirt 112 which depends below the wall 108, and that a reinforcing strip 114 is bent over the free peripheral edge of the skirt 112, and is secured thereto in any suitable fashion. Suitable caster assemblies 116 of conventional construction, provided with casters or rollers 118, are secured, in suitable fashion to the undersurface of the base wall 108, at the four corners, thereof, within the skirt 112.

Provision is made for a top closure seat or cover 120 for the box 98, which is hinged, as at 122—122, to the protective strip 110 at the rear wall 102. Any suitable filler material or padding, such as, for example, and not by way of limitation, foam rubber, may be utilized in the cover 96 so as to provide a comfortable seat on the box 98. A hinged bracket 124 interconnects the cover 120 and the side wall 104, at the inner surfaces thereof, as best illustrated in FIG. 13, so as to limit the opening movement of the cover.

Pursuant to the present invention, the seat cover 120 may be positioned either in its normal closing position to close the box, or it may be releasably retained in an angular or tilted position above the top of the box. In this connection, provision is made within the box or base 98, for the U-shaped support or brace member 126 which is pivotally mounted on the upper surface of the bottom wall 108. More specifically, provision is made on the bottom wall for the spaced pivot bearing members 128—128 which are secured adjacent to the inner surface of the front wall 100. The bight portion 130 of the brace 126 extends through the pivot bearings 128 for pivotal movement on the bottom wall 108. The opposing legs 132—132 of the member 126 are dimensioned so that the member 126 may be pivoted from the raised operative positions thereof, shown in FIGS. 13 and 14, to the lowered inoperative position thereof in which it overlies the bottom wall 108 and wherein the resilient caps 134 at the ends of said arms 132 are adjacent the inner surface of the rear wall 102. In the operative or upright position thereof, the brace member 136 engages the undersurface of the closure seat 120 to retain the latter in the tilted position thereof indicated in FIG. 13, the inner surface of the front wall 100 serving as a detent to prevent the pivotal movement of the brace 126 in a direction outwardly of the box 98.

In use thereof, the ottoman 96 may be utilized as a storage device by using the hollow interior of the box 98 to store various articles, so that the device 96 may serve as a storage hassock. In addition, in the closed disposition of the cover 120, the cover will constitute a comfortable seat so that the device 96 may serve as a conventional hassock, thus providing an additional seat in a room where used. In addition to the foregoing, the ottoman 96 may be utilized in the same manner as the previously described bench ottomans 20, 20', 20" and 20''', in combination with a conventional chair C to form a posture seat or chair. In this connection, it will be understood that the wall 100 of the box 98 will be adjacent to the chair C with the cover 120, tilted as shown, to serve as a leg or footrest so as to form a posture seat with the chair C, in the same manner as previously described in connection with the benches 20', 20" and 20''' and 20.

Referring now to FIGS. 15, 16 and 17 in detail, there is shown a modification of the ottoman illustrated in FIGS. 13 and 14. The ottoman 96' shown in FIGS. 15, 16 and 17 is essentially the same as the previously described ottoman 96 with the exception that provision is made for a brace 126' which is mounted adjacent to the upper periphery of the front wall 100 rather than adjacent the bottom thereof as in FIGS. 13 and 14. More specifically, and pursuant to the present modification, provision is made for a pair of U-shaped channel members 136—136 which are suitably secured to the inner surface of the wall 100 as at 138. As best shown in FIGS. 16 and 17, each member 136 is provided with the opposing arms 140—140 between which there extends the base portion 142. At the upper marginal edge thereof, each of the arms 140 is provided with a cut out or open slot 143 which is adapted to receive and pivotally mount the bight 130 of the brace 126'. In order to prevent the inadvertent disengagement of the bight 130 from the sockets or pivot bearing portions 143, the base 140 of each channel member 136 is provided with integral laterally spaced tabs or ears 144—144 which are bent downwardly to overlie and engage the upper marginal edges of the associated arms 140, as best illustrated in FIGS. 16 and 17.

From the foregoing, it will be apparent that the brace 126' is adapted to pivot in the channel members 136—136 for movement to and from the erect or operative disposition thereof, illustrated in FIG. 15, wherein the brace extends upwardly of the box 98, and to and from an inoperative position thereof in which the brace 126' is displaced by 180 degrees from the position thereof illustrated in FIG. 15 so that the opposing legs 132—132 thereof overlie the inner surface of the front wall 100 outwardly of the adjacent member 136. Pursuant to a feature of the present embodiment, provision is made for the rod like detent segments 146—146 which are suitably secured, as by soldering or welding, to the bight 130 of the brace 126', adjacent each of the legs 132 thereof. More specifically, and as best shown in FIG. 17, each rod like segment is secured on the bight 130 so that it extends between the laterally spaced tabs 144—144 of the associated support member 136, as best illustrated in FIG. 17, in the operative or erect disposition of the brace 126'. In said disposition of the detent rod 146, as shown in FIG. 17 and in broken line in FIG. 16, the rod engages the upper marginal periphery of the reinforcing strip 110, as illustrated in FIG. 16, to limit the pivotal movement of the brace 126' from the inoperative to the erect or operative disposition thereof. In addition, by extending between the associated tabs 144, in said position, it will be noted that the rods 146 prevent the lateral movement of the brace 126'. Furthermore, it will be understood that the rod segments 146 also serve as guide means for the brace 126' during the movement of the latter to the inoperative disposition thereof, as the rod segments move outwardly of the associated tabs 144 to the full line position thereof illustrated in FIG. 16.

In view of the foregoing, it will be apparent that each of the hassock type ottomans shown in FIGS. 13 through 17, may function in the same manner as the previously described bench type ottoman in connection with a conventional chair 70 to convert the latter into a posture or health chair, as previously described.

Referring now to FIG. 18 in detail, there is shown a modification in the hassock illustrated in FIG. 11. The hassock 20'''' is the same, in all details, as the hassock 20''' of FIG. 11, except for the brace and its securement to the seat 26. In the present modification, provision is made for a brace 70' constituted by the two separated U-shaped brace elements 150 and 152. In order to mount said elements for slidable movement on the undersurface 154 of the seat 26, the latter is provided with the casings or sleeves 156 and 158. The casings are substantially channel shaped in cross-section to define slideways 160 for the bights 162 of the brace elements. A compression spring 164 is mounted on each bight between a collar 166 fixed to the bight and an end wall 168 of the associated casing. At one end thereof, each brace element terminates in a finger piece 170, and at its other end in a bent portion 172 which is adapted to engage in the apertures 94 of the adjacent frame member 86 of the frame 85.

The bench ottoman 20'''' is utilized in the same manner as the previously described bench ottoman 20'''. When it is desired to raise or tilt the seat 26 from the closed position thereof to an adjusted position thereof, the finger pieces 170 are squeezed together to compress the springs 164, and when the ends 172 are in registry with the selected apertures 94, the finger pieces are released and the brace elements are biased into said apertures by the expansion of the compressed springs. Said elements may be readily removed from said apertures, to readjust the seat or to close the latter, by simply squeezing the finger pieces or handles 170, as will be readily understood.

While we have shown and described the preferred embodiments of our invention, it will be understood that various changes may be made in the idea or principles of the invention within the scope of the appended claims.

Having thus described our invention, what we claim and desire to secure by letters patent is:

1. A floor supported leg rest bench adapted to be positioned adjacent the front of a chair, comprising a base, a leg support arranged to support the legs of a person seated in the chair and mounted on said base for pivotal movement about a horizontal axis and adapted to lie either in a horizontal position or in a tilted leg-supporting position in which said leg support is inclined forwardly and downwardly from substantially the horizontal level of the chair seat in said adjacent position of the leg support, and means for releasably retaining said leg support in said tilted leg-supporting position thereof, said retaining means comprising a pair of brace elements mounted by said leg support for pivotal movement about a horizontal axis of rotation, said brace elements being also rectilinearly movable in a direction parallel to said horizontal axis between retracted and projected dispositions thereof, and detent apertures defined in said base for receiving said brace elements in the projected positions thereof, respectively, for holding said brace elements in position to retain said leg support in said tilted leg-supporting position thereof.

2. A floor supported leg rest bench adapted to be positioned adjacent the front of a chair, comprising a base, a leg support arranged to support the legs of a person seated in the chair and mounted on said base for pivotal movement about a horizontal axis and adapted to lie either in a horizontal position or in a tilted leg-supporting position in which said leg support is inclined forwardly and downwardly from substantially the horizontal level of the chair seat in said adjacent position of the leg support, and means for releasably retaining said leg support in said tilted leg-supporting position thereof, said retaining means comprising a pair of brace elements mounted by said leg support for pivotal movement about a horizontal axis of rotation, said brace elements being also rectilinearly movable in a direction parallel to said horizontal axis between retracted and projected dispositions thereof, detent apertures defined in said base for receiving said brace elements in the projected positions thereof, respectively, for holding said brace elements in position to retain said leg support in said tilted leg-supporting position thereof, and means for biasing said brace elements to said projected positions thereof, respectively, in which they are received in said apertures.

3. A floor supported leg rest bench adapted to be positioned adjacent the front of a chair, comprising a base, a leg support arranged to support the legs of a person seated in the chair and mounted on said base for pivotal movement about a horizontal axis and adapted to lie either in a horizontal position or in a tilted leg-supporting position in which said leg support is inclined forwardly and downwardly from substantially the horizontal level of the chair seat in said adjacent position of the leg support, and means for releasably retaining said leg support in said tilted leg-supporting position thereof, said retaining means comprising a pair of brace elements mounted by said leg support for pivotal movement about a horizontal axis of rotation, said brace elements being also rectilinearly movable in a direction parallel to said horizontal axis between retracted and projected dispositions thereof, for holding said brace elements in position to retain said leg support in said tilted leg-supporting position thereof, spring means for biasing said brace elements to said projected positions thereof, respectively, in which they are received in said apertures, and a finger piece provided on each brace element for retraction thereof from the projected position thereof against the bias of the associated spring means, said brace elements being movable in opposite directions to engage the associated detent apertures, and said finger pieces being in juxtaposition, whereby said finger pieces can be squeezed together for moving said brace elements to the retracted positions, respectively, thereof.

4. A floor supported leg rest bench adapted to be positioned adjacent the front of a chair, comprising a base, a leg support arranged to support the legs of a person seated in the chair and mounted on said base for pivotal movement about a horizontal axis and adapted to lie either in a horizontal position or in a selected one of a plurality of tilted leg-supporting positions in which said leg support is inclined forwardly and downwardly from substantially the horizontal level of the chair seat in said adjacent position of the leg support, and means for releasably retaining said leg support in a selected one of said tilted leg-supporting positions, said retaining means comprising a pair of brace elements mounted by said leg support for movement between retracted and projected dispositions thereof, a set of vertically spaced apertures for each of said brace elements defined in said base, for receiving said brace elements in the projected positions thereof in selected ones of the apertures of the associated set, for supporting said leg support in a selected one of said tilted leg-supporting positions thereof, spring means for biasing said brace elements to said projected positions thereof, respectively, in which they are received in said apertures, and a finger piece provided on each brace element for retraction thereof from the projected position thereof against the bias of the associated spring means, said brace elements being movable in opposite directions to engage the associated detent apertures, and said finger pieces being in juxtaposition, whereby said finger pieces can be squeezed together for moving said brace elements to the retracted positions, respectively, thereof.

References Cited in the file of this patent

UNITED STATES PATENTS

| | | |
|---|---|---|
| 824,541 | Hager | June 26, 1906 |
| 2,805,706 | Landry | Sept. 10, 1957 |
| 2,838,097 | Gleitsman | June 10, 1958 |
| 2,838,098 | Fuerst | June 10, 1958 |